Aug. 6, 1968 A. BROTHMAN ET AL 3,396,369
QUATERNARY DECISION LOGIC SYSTEM
Filed Jan. 18, 1965 6 Sheets-Sheet 1

INVENTORS
ABRAHAM BROTHMAN
MICHAEL GOMERY
ALLEN H. MILLER
LEE HOROWITZ
BY
OSTROLENK, FABER, GERB & SOFFEN
ATTORNEYS

FIG. 4.

a) CARRIER (FOR SPACE DETECTOR)

b) INVERTED CARRIER (FOR MARK DETECTOR)

c) PHASE MODULATED CARRIER

BINARY STATE   1   0   1   0   0   1 d) COMPARISON (SPACE DETECTOR)

e) COMPARISON (MARK DETECTOR)

THRESHOLD LEVEL FOR MARK AND SPACE COMPARISON CIRCUITS f) THRESHOLD GATE (MARK)

g) THRESHOLD GATE (SPACE CIRCUIT)

FIG. 5B.

INVENTORS
ABRAHAM BROTHMAN
MICHAEL GOMERY
BY ALLEN H. MILLER
LEE HOROWITZ

OSTROLENK, FABER, GERB & SOFFEN
ATTORNEYS

INFORMATION SET — SINGLE, EVEN PARITY BIT

FIG. 11.

|   | $b_1$ | $b_2$ | $b_3$ | $b_4$ |   |   |
|---|---|---|---|---|---|---|
| (1) | $G_1$ | 0 | 0 | 1 | 1 | A BLOCK OF FOUR SINGLE EVEN-PARITY PROTECTED SEQUENCES |
| (2) | 0 | 1 | 0 | 0 | 1 | |
| (3) | 1 | $G_1$ | 0 | 0 | 1 | |
| (4) | 0 | 0 | 1 | 0 | 1 | |
| (5) | 1 | 1 | 1 | 1 | 0 | SINGLE VERTICAL PARITY |

INVENTORS
ABRAHAM BROTHMAN
MICHAEL GOMERY
BY ALLEN H. MILLER
LEE HOROWITZ

OSTROLENK, FABER, GERB & SOFFEN
ATTORNEYS

3,396,369
QUATERNARY DECISION LOGIC SYSTEM
Abraham Brothman, Dumont, and Michael Gomery, Saddle River, N.J., and Allen H. Miller, Laurelton, N.Y., and Lee Horowitz, Cedar Grove, N.J., assignors, by mesne assignments, to Sangamo Electric Company, Springfield, Ill., a corporation of Delaware
Filed Jan. 18, 1965, Ser. No. 426,067
28 Claims. (Cl. 340—146.1)

ABSTRACT OF THE DISCLOSURE

A decision logic circuit for use in improving error detection and correction capabilities of a communication system by examining incoming data bits, dividing each bit into a plurality of Nyquist intervals, examining the state of each Nyquist interval and developing analog signals representative of the total Nyquist states of each incoming bit, which state is utilized by logic means to provide first and second outputs representing the binary state and the quality of the examined bit.

---

The instant invention relates to communications systems and more particularly to decision logic system for use in communications systems to greatly enhance the error detection and correction capabilities of the communications system without any modifications or increases whatsoever in code format, bandwidth requirements, transmitter or receiver capability, and the like, and being universally applicable to any communications system of the digital type.

In present-day communications systems, especially those responsible for transmitting data as opposed to voice transmission, the need for reliability is great. For example, in transmitting data from a remote point to a central computer processing center, it is most important that the data be error-free or its computational value is meaningless. It thus becomes imperative and most necessary to utilize various means to hold errors to a practicable minimum. Some typical methods are:

Use of redundant bits (parity bits) thereby requiring a greater number of data bits to represent each character;

a decrease in bit transmission rate, thereby requiring more time to transmit each character;

an increase in the output energy of the transmitter;

an increase in receiver reception energy;

an increase in the sensitivity of the receiver facility to signal over noise (i.e., high signal-to-noise ratio).

All of the above methods are costly undertakings and also reach practical limitations beyond which additional expenditures fail to yield even an insignificant enhancement in system reliability.

The instant invention provides a significant enhancement in system reliability without any change whatsoever in system facilities and need be provided only at the receiver facility to perform its functions.

The instant invention is comprised of means for examining each received data bit by dividing a data bit into its smallest intelligible interval, known as a Nyquist interval, and establishing the state of the data bit during each Nyquist interval, or portion thereof. Linear means are provided for summing the states of each Nyquist interval within each data bit. Decision is based upon the sum of the number of times a Nyquist interval is in a given state within a binary bit. Threshold means examines the resulting sum of each data bit and generates a selected output representative of the resulting sum. This analog output level is processed by logic circuits which analyzes the analog input information in conjunction with decision logic generated by parallel operating bit decision circuitry of the type generally in use in present-day communications systems. The analysis yields a bit decision signal accompanied by a bit signal which tags the bit decision as being gray (i.e., ambiguous) if so determined by the logic processing circuits.

In the case where a train of binary bits is placed under examination, each bit is divided into a plurality of Nyquist intervals so as to determine the state of each interval. The state existing during each interval controls the linear storage means. The storage means linearly accumulates the analog stage of the total number of Nyquist intervals in each binary bit.

Preset threshold detection means is employed for detecting and hence establishing the requisite amplitude the storage means must achieve for the data bit being examined to be recognized as a valid binary one (or binary zero).

At the end of each bit interval, the analog storage means transfers its voltage output state to the processing logic circuits simultaneously with the transfer of the output state of the threshold means. The processing logic circuit automatically clears the threshold means and analog storage means in readiness for the examination of the next bit in the data train and generates the bit state being examined together with a tag bit signal to denote the ambiguity or "grayness" of the processed bit in cases where the examined bit is errored.

The system has additional capabilities of generating a continuous link history which aids in the statistical evaluation of incoming data to further enhance the reliability of decisions made by the system. The link history may further be employed to automatically control the bit transmission rate of the communications system and/or the code format, which schemes are described in detail in copending application Ser. No. 279,107, entitled Digital Self-Optimizing Terminal, filed May 9, 1963 by Abraham Brothman et al. and assigned to the assignee of the instant invention. Regardless of the specific communications application, the instant invention enhances system reliability by adding error-detection and correction capabilities to the system without any change whatsoever to system code format and/or bit transmission rate.

It is, therefore, one object of the instant invention to provide a novel data examination means for employment in communications systems which greatly improves the reliability of such systems in the determination of the state of incoming bits at the communication system receiver facility.

Another object of the instant invention is to provide novel means for use in communications systems and the like which greatly enhances system reliability by adding error detection and error correction capabilities to the system without any change whatsoever in either code format or system bit transmission rates.

Another object of the instant invention is to provide novel means for use in communications systems and the like employing means for examining incoming data bits by dividing each incoming bit into a plurality of Nyquist intervals, examining the state of each Nyquist interval and developing an analog signal representative of the total Nyquist states of each incoming bit.

Another object of the instant invention is to provide novel means for use in communications systems and the like, employing means for examining incoming data bits by dividing each incoming bit into a plurality of Nyquist intervals, examining the state of each Nyquist interval and developing an analog signal representative of the total Nyquist states of each incoming bit, and wherein means are provided for making a decision as to bit state based upon the stored analog state.

Still another object of the instant invention is to provide novel means for use in communications systems and the like in which incoming data bits are divided into a plurality of Nyquist intervals, the state during each Nyquist interval is employed to control analog storage means, which state is then utilized by threshold means to establish the identity of each bit examined and further comprising means for generating a tag bit in the case where an examined bit is identified as being ambiguous or "gray."

Another object of the instant invention is to provide novel means for use in communications systems and the like in which incoming data bits are divided into a plurality of Nyquist intervals, the state during each Nyquist interval is employed to control analog storage means, which state is then utilized by threshold means to establish the identity of each bit examined and further comprising means for generating a tag bit in the case where an examined bit is identified as being ambiguous or "gray," and further comprising timing means for instantaneously clearing the analog storage means in readiness for processing of the next received data bit.

These and other objects of the instant invention will become apparent when reading the accompanying description and drawings in which:

Figure 1:
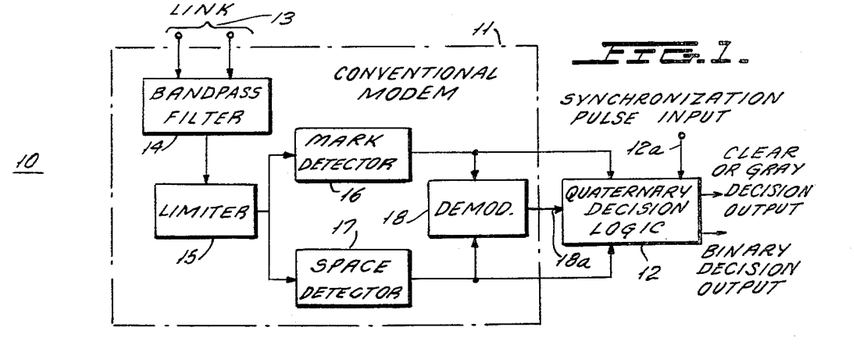
FIGURE 1 is a schematic diagram showing a multi-threshold quaternary output receiving terminal designed in accordance with the principles of the instant invention.

FIGURE 1 shows a terminal 10 which is provided with input terminals 13 for receiving data from the communications link, which data passes through a band-pass filter 14, so as to accept signals within a predetermined frequency range and to reject others, and subsequently to a limiter device 15 which has its output branched to the mark and space detectors 16 and 17, respectively. The mark-space detectors, in one preferred embodiment, such as, for example, a frequency shift keying system, may be employed to detect the mark and space frequencies. The detector outputs are imposed upon a demodulator 18 and the quaternary decision logic circuit 12 for controlling the operation of these circuits.

The demodulator 18 may, for example, be of the type described in copending application Ser. No. 301,110, filed Aug. 9, 1963 by Abraham Brothman et al. and assigned to the assignee of the instant invention. The above-mentioned application sets forth in detail the construction and operation of such a phase shift (or frequency shift) receiver facility. For the purposes of the instant invention, it is sufficient to understand that the demodulator 18 accepts the outputs of both mark and space detectors 16 and 17, respectively, for the purpose of generating a signal at its output 18a to identify either a mark or a space condition. Since the output may be either a mark or space condition, the transformation is typically such as to convert a frequency or phase modulated carrier into a train of square pulses representative of the mark and space bits transmitted.

The quaternary decision logic circuit 12 employs the outputs of both detectors 16 and 17, as well as the output of the modem's demodulator 18. The sampling of both detectors' outputs is carried out for the purpose of:

Nyquist interval by Nyquist interval inspection of each bit;

a bit wide investigation of possible ambiguities;

an evaluation of the threshold zone into which the signal envelope falls for the bit-sampling period.

The output of demodulator 18 is sampled to test for conflict between the binary decision generated by the quaternary decision logic circuit and the demodulator's binary decision and also to resolve any totally ambiguous situation which might occasionally result from the sampling of the outputs of detectors 16 and 17. Input terminal 12a for quaternary decision logic 12 receives synchronization input pulses for synchronizing the operation of the logic circuit with the bit transmission rate for the communications system.

Figure 2:
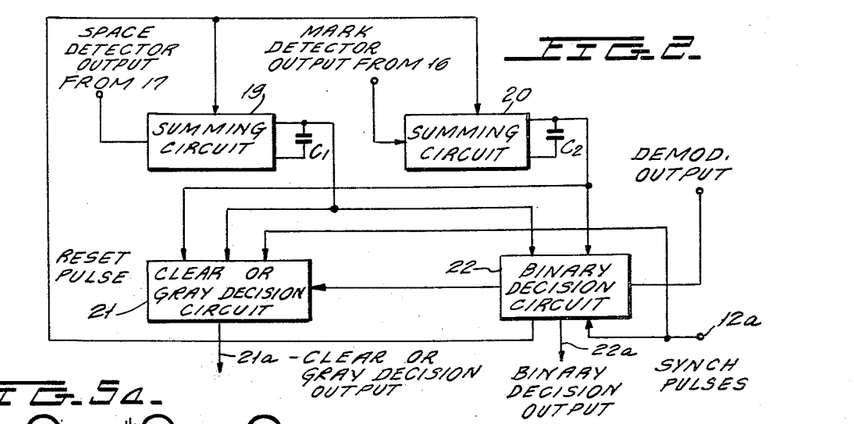
FIGURE 2 is a schematic diagram showing the quaternary decision logic of the circuit of FIGURE 1, in greater detail.

One black box diagram of a quaternary decision logic circuit is shown in FIGURE 2. In the circuit 12 of FIGURE 2, the outputs from mark and space detectors 16 and 17 are respectively impressed upon input terminals of the summing circuits 20 and 19, respectively. Each summing circuit responds to each half-cycle of its input by charging its associated output capacitor $C_2$ and $C_1$, respectively, according to the equation:

$$\Delta E = KE_D \qquad (1)$$

where $\Delta E$ is the increase in capacitor charge per Nyquist interval, $k$ is a constant of proportionality, and $E_D$ is the RMS voltage amplitude of the input half-cycle. The cumulative charge on the capacitors $C_1$ and $C_2$ at the end of a bit-sampling interval are, in turn, inputs to a binary decision circuit 22 and a clear-or-gray decision circuit 21. The output of binary decision circuit 22 is binary one when $E_{C1}$ (the voltage across $C_1$) is greater than $E_{C2}$ (the voltage across $C_2$), and is a binary zero when $E_{C2}$ is greater than $E_{C1}$. The output of the clear-or-gray decision circuit is a "clear" indication when:

The greater of $E_1$ or $E_2$ lies between $E_{MIN}$, a specified lower level, and $E_{MAX}$, the maximum possible charge, and the lower of $E_{C1}$ or $E_{C2}$ is less than a specified level $E_L$.

Conversely, the output of the clear-or-gray decision circuit is a "gray" output when:

either of the two possibilities set forth above is not the case, or when:

$$E_{C1} = E_{C2}$$

or when the final decision of the binary decision circuit is in conflict with the modem's contemporaneous decision generated by the demodulator 18.

Both QDL (quaternary decision logic) decisions at outputs 21a and 22a are rendered when the synchronization pulse input to the QDL at 12a indicates termination of a bit-sampling interval, and both summing circuits are reset for their next duty cycle immediately after the decisions are made. By the combination of the two separate decisions, all bits fall in one of four output categories:

"Clear one"; "gray one"; "gray zero"; or "clear zero," (1); ($G_1$); ($G_0$) and (0), respectively.

The foundation notions of the (1, $G_1$, $G_0$, 0) four-symbol system are:

(1) A majority decision principle as to the binary status of a bit; and, (2) A segregation of the constituent Nyquist intervals within a bit into "clear" or "gray" intervals.

The majority decision principle is founded on Bayes' Statistics, while the "clear" or "gray" Nyquist intervals concept is based on the statistics of noise processes in application to an A.C. information signal and modem principles.

From a data reliability viewpoint, it is more convenient to view the four-symbol output in terms of the following input-output relationships and categories:

$(1/1)+(0/0)=A_b$=unequivocated-and-correct bits (2)
$(1/G_1)+(0/G_0)=B_b$=gray-but-correct bits (3)
$(1/G_0)+(0/G_1)=C_b$=gray-but-incorrect bits (4)

and, $(1/0)+(0/1)=D_b$=undetectably-errored bits (5)

especially because it can be demonstrated that $$p(A_b)>p(B_b)>p(C_b)>p(D_b) \quad (6)$$

In terms of Equations 2 through 6, the four-symbol output of the QDL provides the foundations of:

a reduction of undetectably-errored bits a sharp reduction in the $P_{CEE}$, (probability of direct evasion of code quality provisions by a mutilated sequence), and $P_{EC}$, probability of a spurious code correction (if pertinent), characteristics of a code system via the imposing of "gray" bits per character acceptance limits, a sequence correction capability even in the case of codes which are not intrinsically error-correcting codes, and a link performance measurement which can be used for rational self-adaptive transmission control.

Quantitative evaluation of QDL operation

Figure 3:
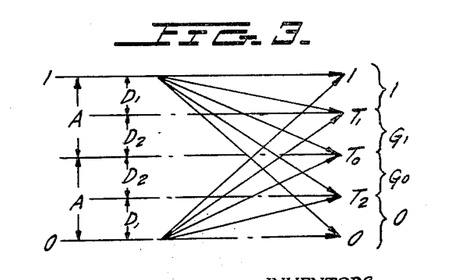
FIGURE 3 shows the information diagram for a multi-threshold quaternary decision logic circuit.

The statistical distribution of Nyquist intervals into $(1/1)$, $(0/0)$, $(1/G_1)$, $(0/G_0)$, $(1/G_0)$, $(0/G_1)$, $(1/0)$, and $(0/1)$ events is easily established by reference to FIGURES 1 and 3. In FIGURE 3 let the line $1 \to 1$ represent the lossless and noise-free transmission of a "1," and, correspondingly, let the $0 \to 0$ line represent the equally ideal transmission of a 0. If $E_i$ were to designate the output of the theoretically engaged (mark) detector 16 under these ideal circumstances and $E_j$ the output of the opposite (space) detector 17, $E_i$ and $E_j$ would then be represented by $$E_i = A \text{ RMS} \quad (7)$$
$$E_j = 0 \quad (8)$$

while the demodulator 18 would then be engaged by a difference signal $$E_i - E_j = A \quad (9)$$

When the constant amplitude output of the limiter in FIGURE 1 contains noise of instantaneous RMS voltage $\delta$, $E_i$ is diminished by an amount $\Delta E_i$ where $$\Delta E_i = k_i \delta \quad (10)$$

while $E_j$ is enhanced according to $$E_j = k_j \delta \quad (11)$$

In Equations 6 and 7, if both detectors apply unity gain to their inputs, $k_i$ is described by $$-1 \leq k_i \leq 1 \quad (12)$$

where the $(-1)$ bound represents noise in its constructive or additive mode and the $+1$ bound represents noise in its destructive action; while $k_j$ ranges according to $$0 \leq k_j 1 \leq \quad (13)$$

In the statistical average of the destructive mode of action of noise, the demodulator is then engaged by a difference signal $$E_i - E_j = A - \Delta E_i - k_j \delta = A - 0.5\delta - 0.5\delta = A - \delta \quad (14)$$

It follows, therefore, that where the signal-to-noise ratio in the limiter's output is given by $m$, $$p[1/1]_N = p[0/0]_N = \frac{m}{\sqrt{2\pi}A} \int_0^{d_1} e^{\frac{-m^2 E^2}{2A^2}} dE \quad (15)$$

$$p[1/G_1]_N = p[0/G_0]_N = \frac{m}{\sqrt{2\pi}A} \int_{d_1}^{d_1+d_2} e^{\frac{-m^2 E^2}{2A^2}} dE \quad (16)$$

$$p[1/G_0]_N = p[0/G_1]_N = \frac{m}{\sqrt{2\pi}A} \int_{d_1+d_2}^{d_1+2d_2} e^{\frac{-m^2 E^2}{2A^2}} dE \quad (17)$$

and $$p[1/0]_N = p[0/1]_N = \frac{m}{\sqrt{2\pi}A} \int_{d_1+2d_2}^{2A} e^{\frac{-m^2 E^2}{2A^2}} dE \quad (18)$$

where $p(\ )_N$=the probability of a Nyquist interval event of the indicated type $E$=the departure of $(E_i - E_j)$ from A RMS amplitude.

Designating $$p[1/1]_N + p[0/0]_N = p[A_N] \quad (19)$$
$$p[1/G_1]_N + p[0/G_0]_N = p[B_N] \quad (20)$$
$$p[1/G_0]_N + p[0/G_0]_N = p[C_N] \quad (21)$$
$$p[1/0]_N + p[0/1]_N = p[D_N] \quad (22)$$

and setting $$d_1 = d_2 = \frac{A}{2} \quad (23)$$

Figure 8:
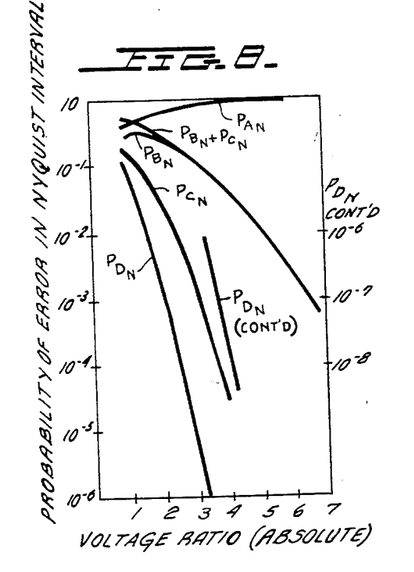
FIGURE 8 is a plot relating signal level to probability of error in a Nyquist interval.

In FIGURE 3, Equations 15 through 18 yield the results shown in FIGURE 8.

Recalling the definitions of clear and gray bits, it is then clear that in the case of a bit in which $n$ Nyquist intervals ar sampled:

$$p(A_b) = 0.5^n \sum_{x=0}^{b} (p[A_N])^{n-x}(p[B_N])^x \quad (24)$$

where $b$ is some designated upper limit for $x$ such that $$b \ll n \quad (25)$$

that $$p(B_b) \approx 0.5^n \sum_{x=b+1}^{n} (p[A_N])^{n-x}(p[B_N])^x \quad (26)$$

that $$p(D_b) = 0.5^n \sum_{x=0}^{b} (p[D_N])^{n-x}(p[C_N])^x \quad (27)$$

and that $$p(C_b) = 1 - (p[A_b] + p[B_b] + [D_b]) \quad (28)$$

Quantitative evaluation of the benefits of multi-threshold quaternary output systems The first of the benefits listed to the credit of the multi-threshold quaternary output MTQO systems is a reduction in the incidence of undetectably-errored bits. This reduction is, at a minimum, defined by $p(C_b)$. Expressing the improvement in this respect in similar terms to equation $$p_u = \frac{p_b}{2}$$

one obtains:

$$p_u = \frac{p(D_b)}{p(C_b) + p(D_b)} p_B \quad (29)$$

Figure 9:
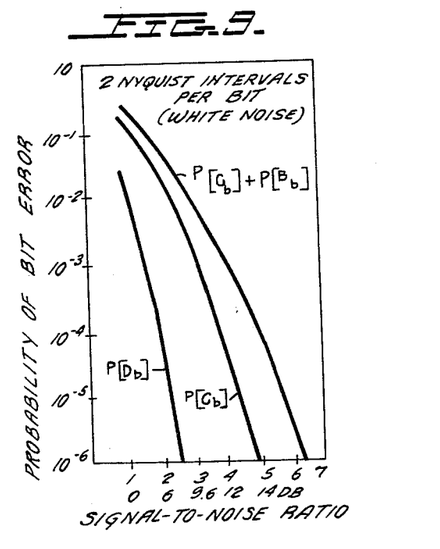
FIGURE 9 is a plot relating signal-to-noise ratio to probability of a bit error.

A clear cut advantages in favor of multi-threshold quaternary output systems over duobinary coding in regard to the reduction of $P_u$ is evident. If Equations 25 through 28 are applied to the case in which $n=2$ and $b=1$, the graphs shown in FIGURE 9 result. Application of Equation 29 to this system results in the indicated graph for $p_u$.

A second benefit of the MTQO system is the improvement in quality which results from the imposing of limits on the number of "gray" bits $n_g$ in an accepted sequence. In the matter of direct evasions of the coding quality, let the permissible number of "gray" bits in an accepted sequence be such that $$0 \leq n_g \leq N, \text{ when } N < n_d \qquad (30)$$

Under this restriction, it can be demonstrated (refer to multi-threshold quaternary system calculation paragraph) that where $(p_{CEE})$ MTQO designates the $p_{CEE}$-parameter of a code in an MTQO system $$(p_{CEE})MTQO = \frac{n_d!}{N!(n_d-N)!} C_1(p[C_b])^N (p[D_b])^{n_d-N} \qquad (31)$$

Defining the improvement (I) in the $p_{CEE}$-parameter relative to the $p_{CEE}$-parameter under conventional transmission conditions by $$I = \frac{(p_{CEE}) \text{ conventional}}{(p_{CEE})MTQO} \qquad (32)$$

it is clear that the use of MTQO conditions with provisions to enforce Equation 30 results in $$I = \frac{N!(n_d-N)!}{N_d!} \cdot \frac{(p[C_b]+p[D_b])^{n_d}}{(p[C_b])^N(p[D_b])^{n_d-N}}$$

$$\approx \frac{N!(n_d-N)!}{n_d!} \left[\frac{p[C_b]}{p[D_b]}\right] n_d^{-N} \qquad (33)$$

In the case of an error correcting code, which is in error correcting duty, it is similarly possible to reduce the probability of an erroneous correction under MTQO conditions by imposing the condition that $$0 \leq n_g N \leq \text{ where } N < n_E \qquad (34)$$

and $n_E$ is number of errored bits per sequence at which correction will be spurious. In this case, if the improvement over conventional bit-decision $i$ is defined by $$i = \frac{(p_{EC}) \text{ conventional}}{(p_{EC})MTQO} \qquad (35)$$

it can be established (refer to multi-threshold quaternary output system calculations paragraph) that $$i = \frac{N!(n_E-N)!}{n_E!} \left[\frac{p[C_b]}{p[D_b]}\right] n_E^{-N} \qquad (36)$$

Figure 10:
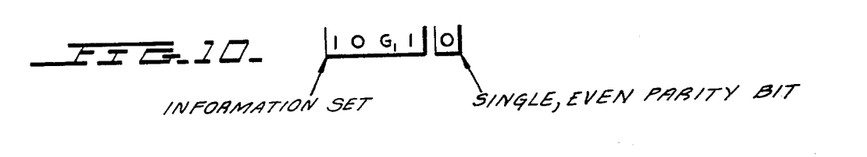
FIGURE 10 shows an example of a binary coded character useful in describing the advantages of the invention.
Figure 11:
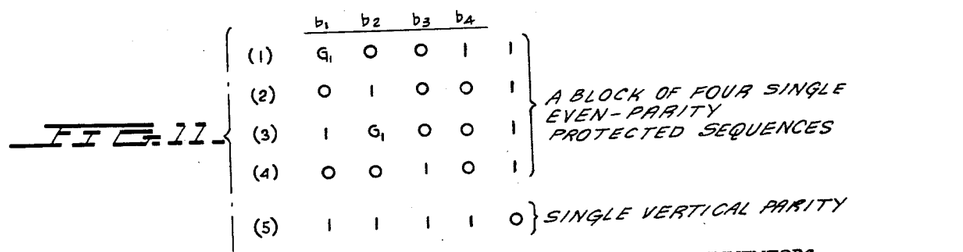
FIGURE 11 shows a chart of a block of coded characters employing vertical parity checking.

The correction capability which the MTQO system conditions can contribute is illustrated in FIGURES 10 and 11. In FIGURE 10, a single, even parity protected 4-bit information-set sequence is shown. The sequence is errored. Though such a code is intrinsically not an error-correcting code under conventional two-symbol conditions, the four-symbol output of MTQO system conditions may be the result of two unequally likely causes. On the basis of the law of simple causes, one may contend that either the $G_1$-symbol in the third bit-position is a $C_b$ event, or that if the $G_1$-symbol is a $B_b$ event then one of the remaining four-bit positions is a $D_b$ event. If Bayes' Criterion is applied to these mutually exclusive arguments, the probability that a correction based on the first argument would be correct is:

$$p_c = \frac{p(C_b)}{p(C_b)+4(p[B_b][D_b])} \qquad (37)$$

where $p_c$ designates the indicated probability. Under most link conditions, this probability would be sufficiently high to warrant correction. Still another, and perhaps more dramatic, illustration of an MTQO-established correction capability is provided by the circumstances of FIGURE 11. Here, the sequences on lines 1 and 3 are errored, and the vertical parity information on line 5 indicates vertical period errors in the $b_1$ and $b_2$ vertical periods.

Taking the $G_1$-symbol in the first bit-position of sequence number 1 to be a $C_b$-event, both the horizontal on line 1 and the vertical error in the $b_1$-period are "corrected"; and, conversely, if we assume the indicated bit to be a $B_b$-event, we are left under the law of simple causes with the alternative of a $D_b$-event in one of four positions of sequence number 1 and a $D_b$-event in one of four bit positions of the first vertical period. Under these circumstances, if the $G_1$ bit in sequence number 1 were corrected to a "0," the probability of correctness would be $$p_c = \frac{p(C_b)}{p(C_b)+4p(B_b)p(D_b)} \cdot \frac{p(C_b)}{p(C_b)+4p(B_b)p(D_b)} \qquad (38)$$

Again, for most link conditions, this probability would be high enough to warrant correction. An identical probability exists in connection with the $b_2$ bit-position of the third sequence, and hence this correction could be made as well. Here, it should be underscored that while any two errored bits in a protection system such as FIGURE 11 would have rendered correction impossible in the case of a conventional two-symbol system, an even larger number of "gray" bits of the $B_b$ and/or $C_b$ types would still permit correction in the case of MTQO system conditions.

Figure 4:
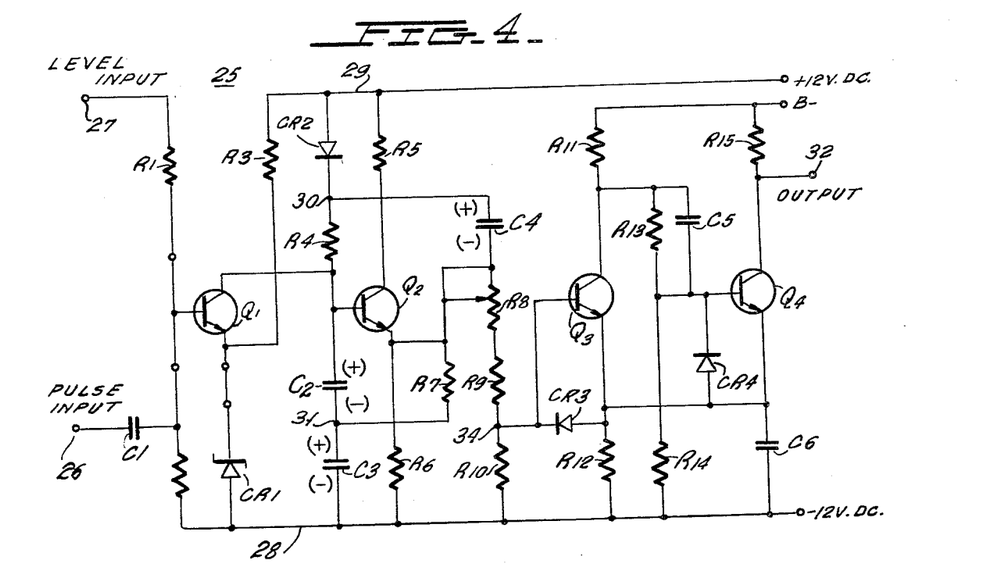
FIGURE 4 is a schematic drawing showing the timing circuit employed in the system of FIGURE 1.

Some of the circuitry of the multi-threshold quaternary output system will now be considered. FIGURE 4 is a schematic of the bit interval timing device employed, for example, in the quaternary decision circuit of FIGURE 7, to be more fully described. The timing circuit, hereinafter designated as a flyback timer, is generally designated by the numeral 25 and is comprised of A.C. and D.C. reset input terminals 26 and 27 for the purpose of resetting the flyback timer circuit and thus beginning a new timing interval, in a manner to be more fully described. These input terminals are connected to the base electrode of a transistor Q1, having its emitter terminal connected through a Zener diode CR1 to D.C. bus 28. The collector electrode of transistor Q1 is connected through the series connected resistor and diode elements R4 and CR2, respectively, to a +12 volt D.C. bus 29. The collector electrode of transistor Q1 is further connected to the base electrode of a transistor Q2, which is connected to the bus 28 through series connected capacitors C2 and C3. The emitter electrode of transistor Q2 is connected through a capacitor C4 to the common point 30 between resistors R4 and diode CR2, thus establishing a feed-back path. The emitter electrode of transistor Q2 is further connected to the base electrode of transistor Q3 through resistors R8 and R9. The feed-back path comprised of capacitor C4, which is connected to terminal 30 of resistor R4, connects this current path through a resistor R4 to the base of Q2. Capacitor C4 develops a constant voltage V across its terminals so as to cause a constant current I to flow through resistor R4. This causes the capacitors C2 and C3 to charge in an extremely linear manner.

The voltage developed across capacitor C3 also appears across the series connected potentiometer R8 and resistors R9 and R10 which form a potential divider circuit to impress a portion of the total voltage across these series connected resistors upon the base electrode of transistor Q3. Transistor Q3 is connected in such a manner as to be normally in cut-off state. The time, or moment at which transistor Q3 is driven into saturation is determined by the rate at which the series connected capacitors C2 and C3 charge.

The collector electrode of transistor Q3 is connected through the parallel connected elements R13 and C5 to the base electrode of transistor Q4 which operates as an amplification stage with the output taken from the collector of transistor Q4 and appearing at the output terminal 32, being inverted and amplified relative to the collector output of transistor Q3.

The operation of the flyback timing circuit of FIGURE 4 (and considering the waveform shown in FIGURE 4a) is as follows:

At time $t_0$, either a D.C. input level is impressed at terminal 27, or an A.C. pulse is alternately impressed at pulse input 26. The D.C. input level (or the A.C. input pulse) is positive relative to the voltage level on bus 28, causing transistor Q1 to be driven into saturation. This causes the capacitors C2 and C3 to discharge instantaneously through transistor Q1 so that the voltage level between the base electrode of transistor Q2 and bus 28 is approximately 2.6 volts. This occurs due to the fact that the Zener diode CR1 is chosen to have a rating of substantially 2.6 volts.

Figures 4A, 7:
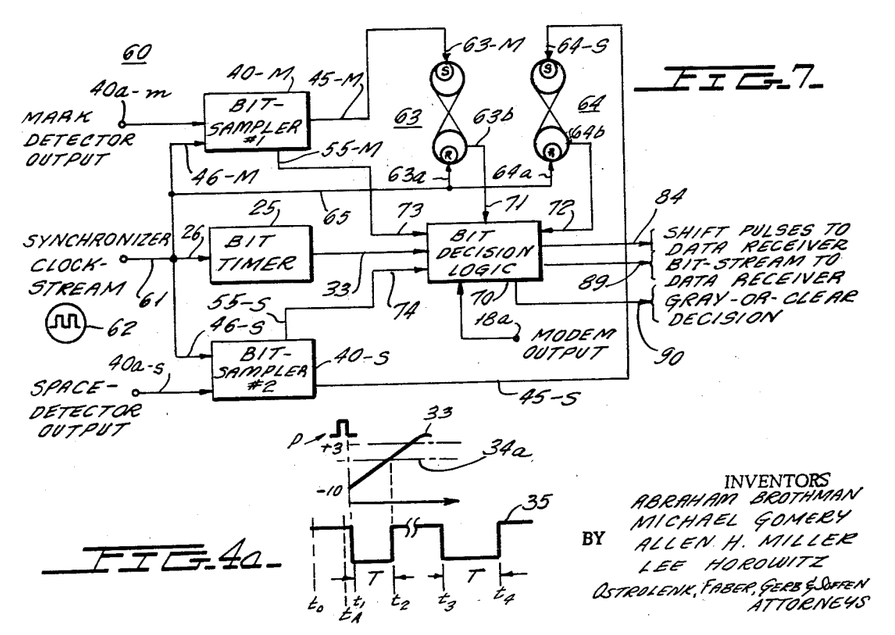
FIGURE 4a is a plot showing the waveform generated by the circuit of FIGURE 4.
FIGURE 7 shows a quaternary decision logic circuit slightly modified from that shown in FIGURE 2.

When this D.C. level, which is initiated at time $t_A$, is removed at $t_1$, the transistor Q1 is immediately driven into cut-off. This occurs at time $t_1$, as shown in FIGURE 4a. The voltage at terminal 31, which is a common terminal between capacitors C2 and C3 is approximately $-10$ volts at time $t_1$, as shown by curve 33 of FIGURE 4a. As soon as transistor Q1 is driven into cut-off, the capacitors C2 and C3 begin to charge in an extremely linear fashion, as shown by the curve 33. The voltage developed across capacitor C3 passes through the voltage divider comprised of potentiometer R8 and resistors R9 and R10 to be impressed upon the base electrode of normally cut-off transistor Q3. As soon as the voltage at common terminal 34 between resistors R9 and R10 reaches the level of approximately B— or ground, which threshold level 34a (see FIGURE 4a) is achieved at time $t_2$, transistor Q3 immediately goes into saturation causing its collector terminal to go negative. This negative voltage level is impressed upon the base electrode of transistor Q4, driving it to cut-off so that its output terminal 32 becomes positive. This is shown by the step-waveform 35 which goes from negative potential to B— voltage level at time $t_2$. The time interval T, which is equal to $t_2-t_1$ is a time interval in which the D.C. level impressed upon input terminal 27 is removed until the time that transistor Q3 is driven into saturation. The linearity of curve 33 very clearly and precisely establishes a timing interval to be employed for use in the quaternary decision logic. The positive voltage level at output terminal 32 as represented by the step waveform 35, shown in FIGURE 4a, will remain at this level until a subsequent D.C. input level or A.C. pulse is impressed upon the input terminals 27 or 26, respectively. If, for example, another pulse is impressed upon input 26 at a time $t_3$ this will drive transistor Q1 into saturation, causing capacitors C2 and C3 to instantaneously discharge and hence begin another timing interval which will be identical in duration to the interval T.

By employing an adjustable potentiometer R8 it is possible to adjust the instant at which transistor Q3 will be driven into saturation from cut-off, thereby yielding an extremely easy and yet powerful means for varying the length of a time interval T. It has been found that through the use of the circuit of FIGURE 4, the timing interval is very simply and very accurately controllable within the limits from twelve seconds to as brief a time interval as a few microseconds. A "linearizing" network employing first and second capacitors C2 and C3 in series connected fashion, together with resistors $R_6$ and $R_7$ as shown in FIGURE 4, helps to maintain an extremely linear charge build up across these capacitors, thereby yielding an extremely accurate circuit for "marking off" a time interval adjustable within extremely wide limits. The flyback timer circuit 25 of FIGURE 4 is extremely useful in marking off the duration of a bit interval and may thereby be used to great advantage in clearing and resetting the analog storage means 40, shown in FIGURE 5 of the instant application.

The analog storage means 40 of FIGURE 5, which is also hereinafter referred to as a staircase generator circuit, is comprised of an input terminal 41 for receiving Nyquist interval information which is to be more fully described, and impressing the Nyquist interval information upon the base electrode of a transistor Q1. Transistor Q1 is connected in inverter-amplifier fashion with its collector electrode connected through resistor R2 to the positive D.C. bus 42 and having its emitter electrode connected through resistor R3 and Zener diode CR1 to the negative D.C. bus 43. The collector electrode of transistor Q1 is connected through the parallel connected components resistor R5 and capacitor C1, to the base electrode of transistor Q2. Transistor Q2 is connected in emitter follower fashion for impedance matching purposes between the inverter-amplifier of transistor Q1 and the base electrode of the next transistor stage Q3. The emitter of transistor Q2 is connected through capacitor C2 and adjustable potentiometer R7 to the base electrode of transistor Q3. Transistor Q3 is connected so as to be normally in cut-off state and has its collector connected to the minus D.C. bus 43 through capacitor C3. When transistor Q3 is driven into saturation this permits the capacitor C3 to charge in a linear fashion so as to cause the common terminal 44 between the collector of transistor Q3 and capacitor C3 to become more positive. Terminal 44 is directly connected to the base electrode of transistor Q6 which has its emitter and collector electrodes respectively, connected across the base and collector electrodes respectively, of transistor Q7 so as to form a Darlington emitter follower circuit to provide substantial current amplification of the signal level at terminal 44. The output of the Darlington emitter follower circuit is taken at the emitter of transistor Q7 and impressed upon the base electrode of transistor Q8 which is connected as an inverter-amplifier circuit with its collector electrode connected to the base electrode of transistor Q9 which also is connected in inverter-amplifier fashion. The output for the staircase generator circuit 40 is taken at the collector electrode terminal 45 of transistor Q9.

Instantaneous discharge of capacitor C3 is provided for by means of the transistor Q5 whose base electrode is adapted to receive a reset input signal at reset input terminal 46 which receives the output level from output terminal 33 of the flyback timer circuit 25, shown in FIGURE 4. A positive voltage level is impressed upon the base electrode of transistor Q5, driving the emitter electrode positive and hence driving the base electrode of transistor Q4 positive so as to drive transistor Q4 into saturation, thus causing instantaneous discharge of capacitor C3 through transistor Q4.

The overall operation of the staircase generator of circuit 40 (considering also the waveforms of FIGURES 5a and 5b) is as follows:

At time $t_1$, which is the same time $t_1$ shown in FIGURE 4a, let it be assumed that a bit interval begins. Let it further be assumed that the bit interval which extends from $t_1$ to $t_2$ contains four Nyquist intervals. For example, if a bit transmission rate is at 625 bits per second, this means that each bit interval is 1.6 milliseconds. Let it be assumed that a local signal generator operation at the system carrier frequency rate, waveforms $a$ and $b$ of FIGURE 5b (at four times a bit rate) of 2500 c.p.s. the generator develops complementary outputs $a$ and $b$ which are compared with the phase modulated carrier, waveform $c$, in both the mark and space detector circuits 16 and 17 of FIGURE 1. The outputs of these two circuits are full wave rectified (waveforms $d$ and $e$) in demodulator 18 and employed to drive threshold gates (not shown) forming the square pulses of waveforms $f$ and $g$. Under normal operation each threshold gate generates an output nearly equal in length to a half-cycle of the carrier, with each half-cycle constituting a Nyquist interval, which is defined as the smallest intelligible portion of a data train. The circuitry employed to generate the carrier and its complement and the circuits employed to perform phase comparison and threshold functions are fully set forth in copending applications Serial Nos. 883,025; 904,890 and 942,522, entitled "Meter Encoder Transmitter"; "Phase Angle Telemetering System" and "Transfer Trip Means", respectively, filed August 23, 1963; June 11, 1964 and October 8, 1965, respectively, all assigned to the assignee of the instant invention and reference should be made thereto for a detailed description of circuit design and operation.

Let it be further assumed that during a bit interval a mark, or one binary bit is being received completely error-free. This means that during the entire bit interval $t_2-t_1$, the mark detector input will achieve (or surpass) the threshold level. This will yield four positive square pulses during the time interval $t_2-t_1$, as shown at 49 (FIGURE 5), from the phase shift demodulator. During each one of these positive square pulse intervals the capacitor C3 will linearly charge by an equal amount. The cumulative voltage developed across capacitor C3 will be sufficient to achieve a predetermined threshold level causing an output signal to be yielded at the output terminal 45, in a manner to be more fully described.

If, however, the mark or binary one data bit being examined has been subjected to link noise so that the binary one bit is not in the binary one phase throughout the entire bit interval, this will affect the phase modulated carrier so that the square pulses generated at the output terminal of the comparison circuit threshold gate will no longer be of equal time duration. Turning now to the waveforms of FIGURE 5a, let it be assumed that the carrier, in transmitting a binary one bit, has been subjected to noise, resulting in the waveform 50 of FIGURE 5a. It can clearly be seen that the four square pulses of waveform 50, while being of equal amplitude, are clearly of unequal time duration due to the effect of noise upon the incoming binary one bit being examined.

Immediately after a bit has been processed, either a D.C. level input or an A.C. pulse input is impressed upon the base terminal of transistor Q1, shown in FIGURE 4. This, substantially discharges series connected capacitors C2 and C3 and begins a new timing interval of time duration T, in the manner previously described. This time interval occurs during time $t_1$ and elapses at time $t_2$. Upon the occurrence of the D.C. input voltage or A.C. pulse input, a positive level occurs, which positive level is impressed upon the input terminal 46 of the staircase generator 40, shown in FIGURE 5. A positive bias is impressed upon the base of transistor Q5 which is connected in emitter follower fashion, causing its emitter electrode to go substantially positive. This positive voltage level is impressed upon the base of transistor Q4, which is instantaneously driven into saturation. The saturation state of transistor Q4 causes capacitor C3 of circuit 40 to instantaneously discharge. At time $t_a$ occurring a brief interval after time $t_1$, the first Nyquist interval square pulse 50a of waveform 50 is impressed upon the base input terminal of transistor Q1. Transistor Q1 inverts the signal level at its base and presents its output from the collector electrode to the base electrode of transistor Q2. The voltage level at the base of Q1 being positive, causes its collector to go negative, impressing a negative pulse upon the base of transistor Q2. This is shown by the square pulse 51a of waveform 51. Transistor Q2 being connected in emitter follower fashion, generates a negative square pulse at its emitter electrode and impresses this negative square pulse upon the base of transistor Q3, driving transistor Q3 into saturation. The saturation state of transistor Q3 causes capacitor C3, connected in series with its collector electrode, to charge in an extremely linear manner as shown by the waveform 52. The charging of capacitor C3 continues for the inverval of the negative square pulse 51a and specifically during the time interval $t_b-t_a$. At time $t_b$, positive square pulse 50a terminates, causing the negative square pulse 51a to go positive at this time. This instantaneously drives transistor Q3 into cut-off, preventing capacitor C3 from undergoing any further charging. This condition is maintained until time $t_c$ at which the next positive square pulse 50b is impressed upon input terminal 41. Square pulse 50b has the same amplitude as square pulse 50a, but has a much smaller time interval. During this time interval, the transistor Q3 is again driven into saturation, causing capacitor C3 to again begin charging. This condition lasts until time $t_d$, thereby adding an additional cumulative charge across capacitor C3. The time duration of square pulse 50b is due to the fact that the binary one bit as represented by waveform 53 has experienced noise during the time interval $t_{d'}-t_d$ causing the square pulse 50b to be generated during the second Nyquist interval. The noise may have been caused by link disturbances or any other phenomenon, thereby acting to deteriorate the quality of the binary one bit being received.

In a like manner, the square pulses 50c and 50d are generated and having their time intervals substantially equal to the time interval of pulse 50a and substantially greater than the time interval of pulse 50b due to the fact that no noise occurred during these Nyquist intervals. Thus, during these time intervals $t_f-t_e$ and $t_h-t_g$ capacitor C3, due to the saturation of transistor Q3 during these intervals, increases the voltage drop across its terminals by the amounts shown by the "staircase" waveform 52.

The criteria of acceptance of a binary bit may be set at any desired level. For example, the ideal criteria may be set up so as to require that the binary one level of the bit represented by waveform 53 may be present during the entire interval from time $t_1$ to time $t_2$. This level hereinafter referred to as the threshold level is represented by the horizontal line 54 of FIGURE 5a. This threshold level is achieved by virtue of the transistor Q8 which is biased so that its cut-off level is substantially at the threshold level represented by horizontal line 54. This threshold level may be readily adjusted by virtue of the potentiometer R15. The output level at terminal 44 of capacitor C3 is connected to the base of transistor Q6, which transistor is so connected with transistor Q7 so as to form a Darlington emitter follower circuit. An emitter follower circuit of this type is employed for the purpose of yielding high current gain for the circuit. The output of the Darlington emitter follower arrangement is taken at the emitter of transistor Q7 and is coupled through series connected resistors R16 and potentiometer R15 to the base of transistor Q8. As previously mentioned, transistor Q8 is maintained in cut-off state until the voltage level at its base electrode becomes sufficiently positive to drive it into saturation. In the graphic example of FIGURE 5a, the threshold level has been selected so as to require that less than the entire bit duration of all the Nyquist intervals 50a–50d be present. In accordance with the link requirements of any given application, this threshold level may be selected dependent upon the desired reliability of the system in which it is employed.

Once the threshold level is achieved and transistor Q8 is driven into saturation, the collector electrode goes negative, driving transistor Q9 instantaneously into cut-off and hence yielding a positive output signal at its collector terminal output 45.

The flyback timer circuit 25 of FIGURE 4 very accurately measures a bit interval having a time duration T so as to generate a reset pulse at time $t_2$ which is impressed upon input terminal 46 causing transistor Q5 to be driven into saturation which, in turn, drives transistor Q4 into saturation so as to instantaneously discharge capacitor C3 in readiness for examination of the next binary bit to be received.

Figure 5:
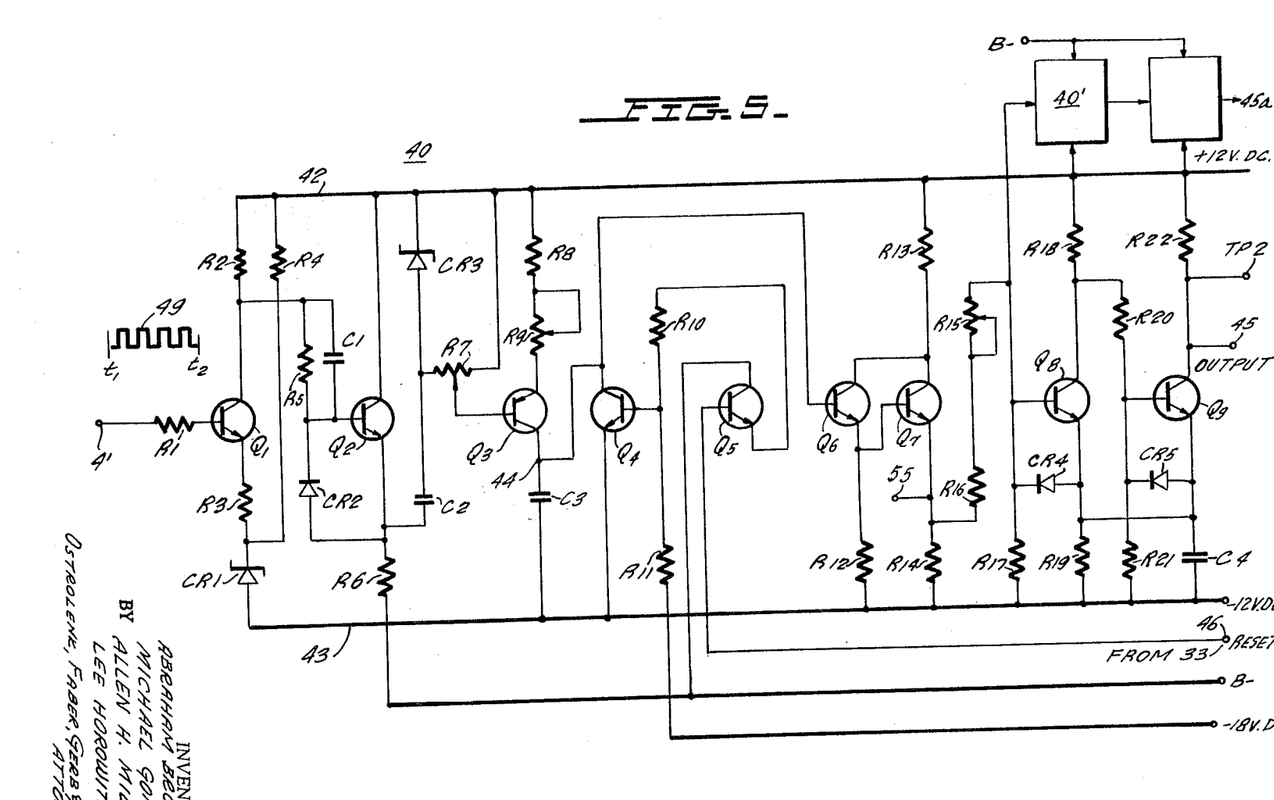
FIGURE 5 is a schematic drawing showing the analog storage means employed in the system of FIGURE 1.
Figure 5A:
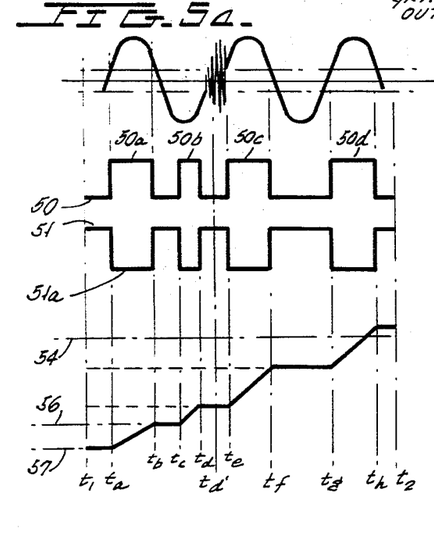
FIGURES 5a and 5b show a plurality of waveforms for describing the operation of the analog storage means of FIGURE 5.
Figure 5B:
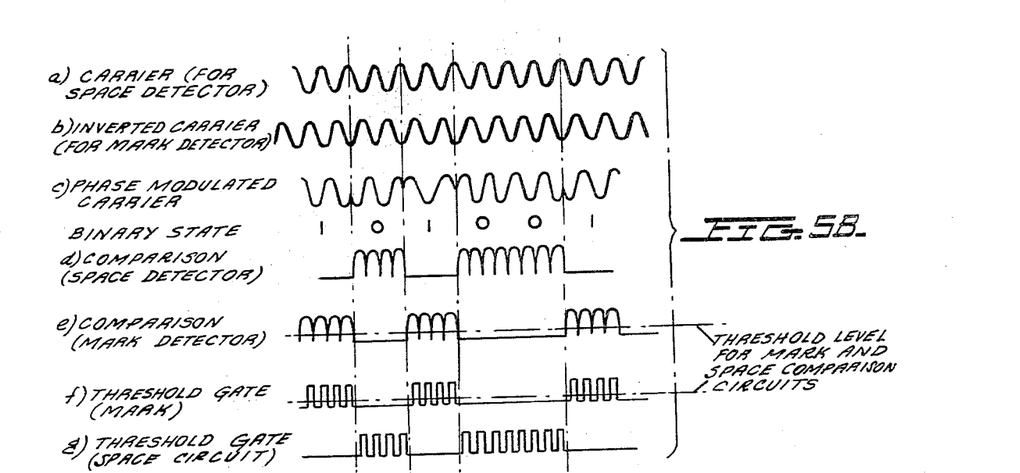

FIGURE 7 shows the quaternary decision logic circuit employing the flyback timer circuit 25 of FIGURE 4 and the staircase generator circuit 40 of FIGURE 5. The quaternary decision logic circuit 60 employs a mark-bit sampler or staircase generator circuit 40–M and a space-bit sampler, or staircase generator 40–S. These sampling circuits receive at their input terminals 40a–M and 40a–S, respectively, the outputs of the mark and space detectors 16 and 17, shown in FIGURE 1, for example. The reset input terminals 46–M and 46–S are connected to the input terminal 61 of a clock pulse source 62 which operates in synchronism with the incoming data train so as to accurately time off bit intervals. Flyback timer circuit 25 has its input terminal 26 (for example) coupled to the output of the synchronizing clock source 62 in order to undergo a like reset operation. The outputs 45–M and 45–S of the threshold circuits are coupled from the bit sampler 40–M and 40–S to the set input terminals 63–M and 64–S of the bistable flip-flops 63 and 64, respectively. The reset input terminals 63a and 64a of the bistable flip-flop circuits 63 and 64 are coupled in common to bus 65 which, in turn, couples the synchronizer clock source 62 thereto. The output terminals 63b and 64b of flip-flops 63 and 64 are respectively coupled to first and second input terminals 71 and 72 of bit decision logic circuit 70 which processes the incoming information, in a manner to be more fully described.

Each staircase generator circuit (see FIGURE 5) develops an analog voltage output at its terminal 55 representative of the analog state or accumulated voltage across the capacitor C3. These analog voltage levels are impressed upon the input terminals 73 and 74, respectively, of bit decision logic circuit 70 for a purpose to be more fully described. The bit decision logic circuit 70 accepts the output information from the staircase generator threshold circuits; the analog information from the staircase generator circuits; as well as the output from modem demodulator 18, shown in FIGURE 1, in order to generate shift pulses at its output 84; data bits at its output 89 and clear decision or gray tag bits at its output 90 which functions are to be more fully described.

Figure 6:
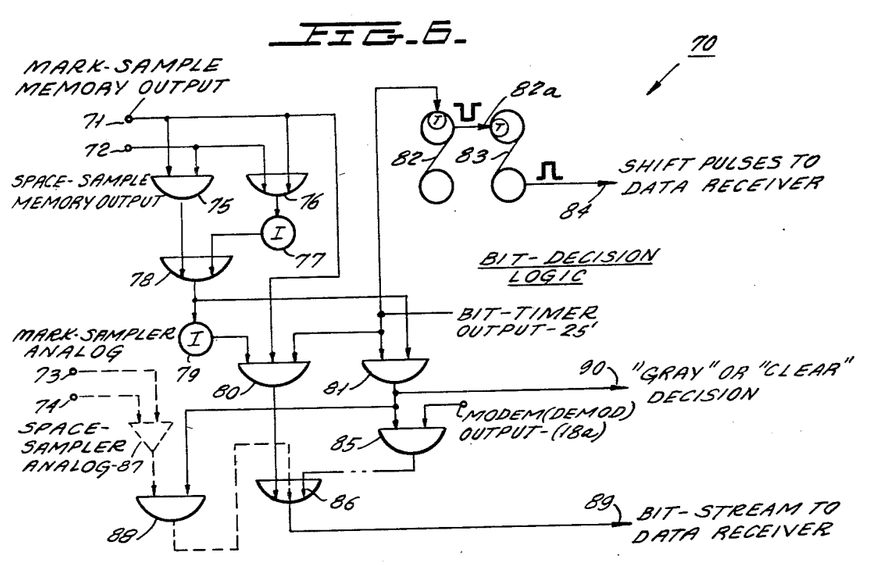
FIGURE 6 shows a logical diagram of the bit decision logic employed in the systems shown in FIGURES 1 and 2.

Turning now to FIGURE 6, there is shown therein a logic diagram of the bit decision logic circuit 70. Circuit 70 is comprised of input terminals 71 and 72 for receiving the output information from the mark and space detectors. Input terminal 71 is simultaneously coupled to one input of AND gate 75; one input of OR gate 76 and one input of AND gate 80. Input terminal 72 is simultaneously coupled to one input of AND gate 75 and one input of OR gate 76.

The analog outputs of staircase generator circuits 40–M and 40–S are impressed upon the input terminals 73 and 74, respectively, of logic circuit 70 which input terminals are coupled to a difference amplifier circuit 87 which is so designed as to generate a binary one output when the mark sampler analog level is greater than the space sampler analog level and to generate a binary zero output when the mark sampler analog level is equal to or less than the space sampler analog voltage level. The remaining input terminal of bit decision logic circuit 70 is the terminal connected to the output terminal 33 of bit timer circuit 25. This input terminal simultaneously impresses the output of bit timer circuit (i.e., flyback timer) 25 upon one input of AND gate 80; one input of AND gate 81 and the trigger input of a one-shot multivibrator 82.

The operation of the bit decision logic circuit 70 occurs as follows:

Let it be assumed that the saircase generator 40–M of FIGURE 7 has recognized the presence of a mark or binary one bit due to the fact that the voltage developed across its charging capacitor has been sufficient to achieve the preset threshold level. This causes a positive level output to be impressed upon the set input terminal of bistable flip-flop circuit 63. This drives its output terminal 63b to binary one state, causing a binary one state to appear at the input terminal 71 of bit decision logic circuit 70. Simultaneously therewith, let it be assumed that the threshold circuit of the staircase generator circuit 40–S has not reached its threshold level so that its output terminal 45–S is at binary zero state, indicating the fact that a spaced or binary zero condition is not present. This voltage level fails to set bistable flip-flop 64 so that its output terminal 64b remains at binary zero level. It should be understood that as soon as the bit timing interval began the first synchronizer clock pulse has reset bistable flip-flop 63 and flip-flop 64 so that their output terminals 63b and 64b were initially in the binary zero state.

Thus, through the operation of staircase generator circuits 40–M and 40–S, outputs 63b and 64b of bistable flip-flops 63 and 64 are at binary one and binary zero states, respectively. Turning specifically to FIGURE 6, this means that a binary one state and a binary zero state are impressed upon the input terminals of AND gate 75, thereby preventing a binary one state to pass through the AND gate. The binary one and binary zero states are also simultaneously impressed upon the inputs of OR gate 76 which passes the binary one state through to the input Thus, OR gate 78 at this given instant has two binary zero state and impressed upon one input of OR gate 78. Thus, OR gate 78 at this given instant has two binary zero states at its input terminals yielding a binary zero state at its output terminal. This is converted to a binary one state by inverter circuit 79, thereby impressing binary one upon one input of AND gate 80.

The input terminal 71, being at binary one state due to the presence of a mark or binary one pulse, likewise impresses a binary one upon the second input of AND gate 80. The third input of AND gate 80 is received from the output of bit timer 25 which goes to the binary one state at the end of a bit interval. Thus, when the bit interval just examined terminates and a binary one state has been recognized by the mark-bit sampler and no binary zero state has been recognized by the space-bit sampler, AND gate 80 passes the binary one state through its output to one input of OR gate 86 which yields a binary one state at its output terminal 89.

Simultaneously therewith the bit timer output impresses its binary one level upon one input of AND gate 81 at the termination of the bit interval. The remaining input of AND gate 81 is coupled to the output of OR gate 78 which is at binary zero state. Thus, AND gate 81 has a binary zero state at its output terminal 90 which indicates that the binary bit just received and examined is a clear, unambiguous binary one.

The output of the bit timer circuit is likewise simultaneously impressed upon the trigger input of one-shot multivibrator 82 generating a negative going square pulse output at its output terminal 82a. The trailing edge of this negative square pulse triggers the trigger input terminal of one-shot multivibrator 83, generating a positive square pulse output at its terminal 84. This positive square pulse output at terminal 84 is employed as a shift pulse which occurs a predetermined time delay after the binary one bit appears at the output terminal 89.

A description of the bit decision logic circuit 70 has been given for the instance in which the input terminals 71 and 72 receive binary one and binary zero level signals. Let it now be assumed that the space sampling staircase generator indicates that a space or binary zero bit has been received and that the mark bit staircase generator circuit indicates that no mark bit has been received during the next bit interval. For this combination of input information AND gate 75 yields a binary zero output while OR gate 76 yields a binary one output. This impresses binary zeroes upon OR gate 78 whose output goes to binary zero. This impresses a binary zero state upon one input of AND gate 81 and through inverter 79 impresses a binary one state upon one input terminal of AND gate 80. Since the input terminal 71 is at binary zero due to the fact that no mark bit has been recognized the middle input terminal of AND gate 80 is at binary zero. At the termination of the bit interval the remaining input terminal of AND gate 80 goes to binary one, but due to the lack of simultaneous presence of three binary one states at the input terminals, the output of AND gate 80 goes to binary zero, thereby failing to yield a binary one state at the output terminal 89 of OR gate 86. AND gate 81, at the termination of the bit interval likewise yields a binary zero at its output 90 to indicate that the binary zero state which has been processed is clear and unambiguous. In a like manner as previously described, the shift pulse is generated at output terminal 84.

The other two possible combinations which may occur after examination of an incoming data bit is that both the mark and space bit staircase generator circuits will indicate the presence of mark and space bits, or will indicate the absence of both mark and space bits. In the case where both the mark and space pulse are indicated as being present simultaneously, AND gate 75 and OR gate 76 generate binary ones at their outputs. This causes OR gate 78 to be binary one at its output, impressing a binary one state upon one input of AND gate 81. The binary one state at the output of OR gate 78 is converted to binary zero by inverter 79 with this state being impressed upon one input of AND gate 80, thereby inhibiting it from generating a binary one at its output and hence impressing a binary zero state upon one input of OR gate 86. At the termination of the bit interval the bit timer output goes positive passing a binary one state through to the output of AND gate 81 and impressing this condition simultaneously upon one input of the AND gates 85 and 88. The binary one output of AND gate 81 appears at the output terminal 90 which indicates that the bit just examined is in gray or ambiguous condition.

The second input terminal of AND gate 85 is connected to the output 18a of demodulator 18 shown in FIGURE 1 which, independently of the staircase generating circuits 40–M and 40–S makes its own examination and determination of the incoming bit being examined. Even though the preselected threshold levels may not have been achieved, the modem still, nevertheless identifies an incoming bit as either binary one or binary zero. If the incoming bit be binary one, this state is passed through AND gate 85 and OR gate 86 to the output terminal 89 which, in turn, is connected to a suitable data receiving means (not shown) which typically may be comprised of shift register means for loading all of the data bits comprising a character. A character long shift register may further be provided with the capability of simultaneously shifting all bits of the receive character into some intermediate or final storage means for further processing. Thus, at this given instant the state of the binary bit appears at output terminal 89 and a binary one bit simultaneously therewith appears at output terminal 90 "tagging" the processed bit as being gray or ambiguous.

Another manner of resolving as to whether a bit examined is either binary one or binary zero in the case where the threshold levels have both been achieved, is by means of the difference amplifier 87 and AND gate 88. When AND gate 81 generates a binary one condition indicative of a gray or ambiguous bit, this binary one state is impressed upon one input of AND gate 88. The other input of AND gate 88 is coupled to the output of difference amplifier 87 which generates a binary one output of the analog level of the mark sampling circuit is greater than the analog level of the space sampling circuit and which generates a binary zero if the mark analog voltage is equal to or less than the space analog voltage. Depending upon the output of the difference amplifier 87, AND gate 88 will generate a binary one or binary zero condition to be passed through OR gate 86 to the output terminal 89. Thus the bit decision logic circuit has the capability of examining each bit, determining its oneness or zeroness and determining its clearness or grayness regardless of what state the incoming bits may be due to link or other disturbances in the communications system.

In a like manner, if neither threshold level of the mark and space bit sampling circuits 40–M and 40–S, respectively, is achieved so that binary zero states are impressed upon the input terminals 71 and 72 of bit decision logic circuit 70, a gray or ambiguous bit will be generated at output 90; a shift pulse will be generated at output 84 and either a binary one or binary zero bit will be generated at output 89, depending upon the condition of either the demodulator circuit 18 of FIGURE 1 or the difference amplifier 87. In addition to the above capabilities, the quaternary decision logic circuit of FIGURE 7 may employ greater or lesser Nyquist intervals than the four Nyquist intervals employed in the example of FIGURE 5a. By increasing the number of Nyquist intervals (i.e., increasing the number of carrier cycles per data bit) this acts to increase the accuracy of the bit examination process. In accordance with such Nyquist interval modifications the threshold levels may further be adjusted to yield more or less rigorous examination of each incoming data bit. As still a further modification, it is possible to employ a single staircase generator circuit of the type 40, shown in FIGURE 5, and provide a second threshold circuit for measuring a lower threshold level. For example, considering FIGURE 5, a second threshold circuit 40' may be coupled with its input terminal in common with the input to the base electrode of transistor Q8, shown in FIGURE 5, with a threshold level which is very close to the zero reference line 57, shown in FIGURE 5a. Thus, the output 45 of the threshold circuit shown in FIGURE 5, will generate a binary one state when the threshold level 54 is achieved, while the second threshold circuit 40' will generate a binary one state at its output 45a so long as the output voltage of terminal 44 of capacitor C3 is less than the threshold level 56, shown in FIGURE 5a.

Figure 12:
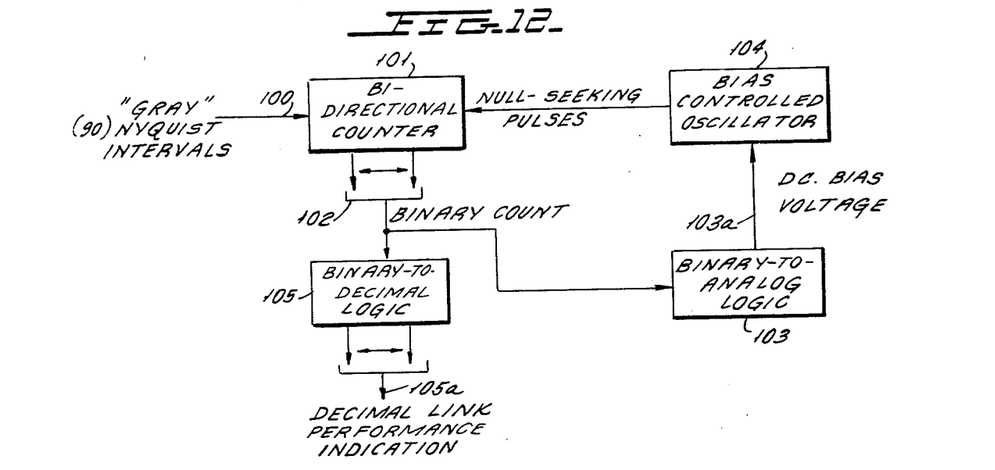
FIGURE 12 is a block diagram showing an arrangement for determining link performance of a communications system which employs the instant invention.

Observing equations 37 and 38, developed above, it is clear that the exact values of $P_c$ would be known were it possible to measure the instantaneous link performance. Indeed, were the link performance a measurable parameter, it would be possible in equations 33 and 36 to adopt the values of N which are consistent with a specified system quality. Just such a measurement is afforded by either the counting of gray Nyquist intervals per unit of time, or by the counting of gray bits per fixed sample of received bits. A measurement bridge based on gray Nyquist interval counting is shown in FIGURE 12. Here, gray Nyquist intervals are applied at input 100 to a bi-directional counter 101. The binary count at output terminals 102 resulting from the counting of the gray intervals is in turn converted by a binary-to-analog logic circuit 103 into a contemporaneous D.C. bias voltage at 103a which is then applied to a linear bias controlled oscillator 104. The output of the bias-controlled oscillator 104 is then returned to the bi-directional counter as a reverse-counting input at 104a, tending to stabilize the count on the counter 101. If the oscillator is given proper design parameters, the "feedback count" per unit of time will match the gray interval frequency, and, as a result, the output of the binary-to-decimal logic circuit 105 then provides a link performance measurement which can be used for control purposes. Realizing that the output of the binary-to-decimal logic is indeed twice the sum of Equations 16 and 17, the "measurement" is immediately indicative of both the frequency of $A_N$ and $D_N$ events in Equations 19 and 23 and, by the same token, are quantitatively indicative of $A_b$ and $D_b$ events as per Equations 24 and 27. A basis is therefore provided for rational feedback control from the receiving end of an MTQO system to the transmitting end to control both the bit-rate and the coding to meet prescribed quality specifications. In controlling bit-rate (i.e., bit-rate optimization), the average in-band power to the receiving end is adjusted. In switching between alternate coding schemes (i.e., code optimization), security properties which are consonant with contemporaneous link conditions are enabled. Perhaps, one of the most interesting of code optimization possibilities is that of inserting or withholding vertical and/or diagonal parity sets which are generated on a standby basis at the transmitting end for a code of constant horizontal format.

Figure 13:
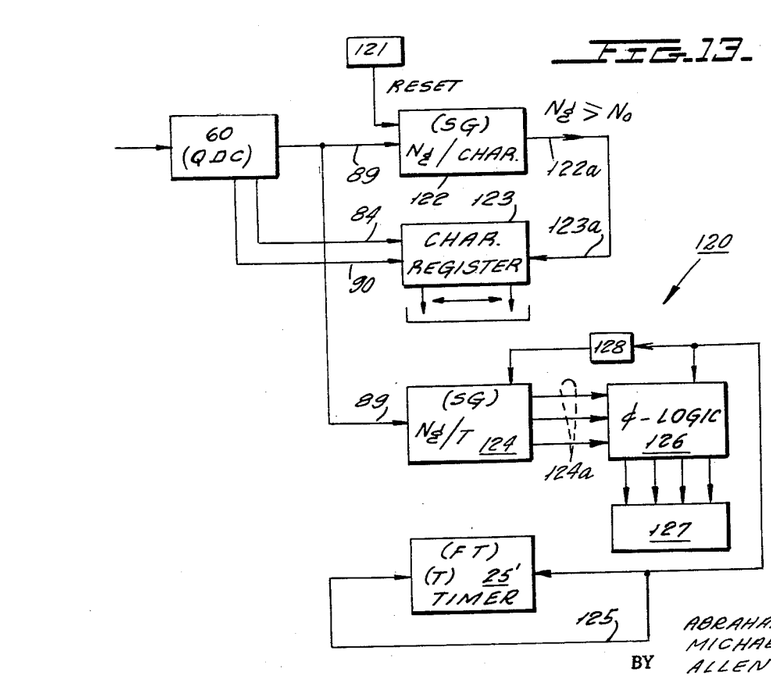
FIGURE 13 is a block diagram showing another arrangement for monitoring link history.

The quaternary decision logic circuit of FIGURE 7 may be employed in the receiver facility 120, shown in FIGURE 13. The terminal facility 120 is comprised of a quaternary decision logic circuit 60 having output terminals 84, 89 and 90, which terminals appear at the shift pulse, bit stream and gray or clear decision signals, respectively. At the beginning of reception, a timing circuit 121 generates an output to reset a counting circuit 122. Counting circuit 122 may be any suitable counting means which generates a signal at its output terminal 122a when the number of counts stored therein is equal to or greater than a preset number $N_0$. As data bits are received by the quaternary decision logic circuit 60, they are impressed upon the input of a character register 123 which is any suitable shift register means for shifting in all the binary bits comprising a single character. Each binary bit is loaded into character register 123. The shift pulses from output 84 shifts each bit of the character so loaded into the register. Counting circuit 122 counts the number of gray bits per character and generates an output signal at 122 if this number is achieved during the receipt of one character. If the preset level $N_0$ is achieved during the receipt of the character, output 122a is impressed upon the reset input 123a of character register 123 to prevent the mutilated character from being employed by any ouput utilization means. The gray bits at output terminal 89 are also impressed upon the input terminal of another counting circuit 124 which counts the number of gray bits occurring within a predetermined time interval T. This time interval is determined by the flyback timing circuit 25' which may be substantially identical in design to the fly-back timer circuit 25 of FIGURE 4. The output of flyback timer circuit 25' is coupled through a feedback path 125 to its input and simultaneously therewith coupled to one input of an AND logic circuit 126. The counting circuit 124, upon the beginning of a timing cycle by flyback timer 25 is reset to zero by the output of flyback timer 25' and then begins to count the number of gray or ambiguous bits during the timing interval. At the end of the timing interval the output 124a of counter 124 is impressed upon AND logic circuit 126 so as to pass this count through AND logic 126 into temporary storage means 127. In order to insure the fact that AND logic 126 successfully will pass the count-of-counter 124 to temporary storage means 127, a suitable delay may be provided at 128. Through the use of the receiver facility 120, shown in FIGURE 13, characters having gray bits which achieve a preset number are discarded and the number of gray bits occurring per a given time interval T may be utilized in order to establish the link history. The number of gray bits per time interval T are stored in temporary storage means 127 and may be employed to request a change in bit transmission rate, coding format and the like between the transmitter and receiver facilities, as well as being employed as an aid in yielding statistical information which may cooperate with the examination of incoming bits to establish their oneness or zeroness.

It can therefore be seen from the foregoing descriptions that the instant invention provides a unique quaternary devision logic capability which may be employed in already existing communications systems for the purpose of establishing the state of incoming binary bits, as well as establishing their ambiguity or clarity through use of a Nyquist interval examination so as to enhance the communications system reliability by yielding additional error-detection and error-correction capability to the system without any change whatsoever in the format of the information transmitted or in bit transmission rate.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. For use in a communications system to establish the ambiguity or clarity of each binary data bit received, comprising first voltage storing means for summing each Nyquist interval within each received data bit; second means coupled to said first means for generating an output signal when the voltage level stored by said first means reaches a predetermined threshold level; third means for timing the interval of a data bit; said first means having reset means coupled to said third means for discharging said first voltage storage means in readiness for examining the next data bit to be received; fourth means coupled to said first voltage storing means for generating an output when the voltage level stored by said first means achieves a second predetermined level; logic circuit means receiving the outputs of said first, second and fourth means for generating first and second outputs representing the binary state and the quality of the examined bit respectively.

2. The device of claim 1 wherein said logic circuit means further comprises delay means responsive to said third means for generating a shift pulse a predetermined time after the end of a bit interval.

3. The device of claim 2 further comprising shift register means coupled to said delay means and said logic circuit means for loading and storing the examined data bits.

4. The device of claim 3 further comprising counter means coupled to said delay means and said logic circuit means for counting the number of data bits being tagged as errored over a predetermined time period.

5. The device of claim 3 further comprising counter means coupled to said delay means and said logic circuit means for counting the number of data bits being tagged as errored over a predetermined time period; said counter means comprising means for generating an output when the count accumulated therein attains a predetermined number; means coupling said counter means output to said register means for discarding the contents of said register means when said predetermined count is achieved.

6. The device of claim 1 wherein said first means is comprised of normally cut-off transistor means having its control element connected to a source of Nyquist interval signals; capacitor means, and a charging circuit for said capacitor means completed by said transistor means during each Nyquist interval in which a signal is present at its input to provide linear charging of said capacitor.

7. The device of claim 6 wherein said reset means is comprised of normally cut-off transistor means being coupled across said capacitor means for instantaneously discharging said capacitor means upon receipt of an output signal from said timing circuit.

8. For use in a communications system to establish the ambiguity or clarity of each binary data bit received comprising first and second voltage storing means for receiving Mark and Space data bits, respectively, for summing each Nyquist interval within each received data bit; third and fourth means coupled to said first and second means respectively, each generating an output signal when the voltage level stored by its associated voltage storage means reaches a predetermined threshold level; fifth means for timing the interval of a data bit; said first and second means each having reset means coupled to said fifth means for discharging said first and second voltage storing means in readiness for examining the next data bit to be received; logic circuit means receiving the outputs of said first, second, third, fourth and fifth means for generating first and second outputs representing the binary state and the quality of the examined bit, respectively.

9. The device of claim 8 wherein said logic circuit means further comprises delay means responsive to said fifth means for generating a shift pulse a predetermined time after the end of a bit interval.

10. The device of claim 9 further comprising shift register means coupled to said delay means and said logic circuit means for loading and storing the examined data bits.

11. The device of claim 10 further comprising counter means coupled to said delay means and said logic circuit means for counting the number of data bits being tagged as errored over a predetermined time period.

12. The device of claim 10 further comprising counter means coupled to said delay means and said logic circuit means for counting the number of data bits being tagged as errored over a predetermined time period; said counter means comprising means for generating an output when the count accumulated therein attains a predetermined number; means coupling said counter means output to said register means for discarding the contents of said register means when said predetermined count is achieved.

13. The device of claim 8 wherein said first and second means are each comprised of normally cut-off transistor means having its control element connected to a source of Nyquist interval signals capacitor means and a charging circuit for said capacitor means completed by said transistor means during each Nyquist interval in which a signal is present at its input to provide a linear charging of said capacitor.

14. The device of claim 13 wherein said reset means is comprised of normally cut-off transistor means being coupled across said capacitor means for instantaneously discharging said capacitor means upon receipt of an output from said timing circuit.

15. The device of claim 1 wherein said timing means is comprised of transistor means; series connected resistor and capacitor means having first terminals connected in common to the base terminal of said transistor means; and impedance means coupled between the emitter of said transistor means and the second terminal of said resistor means for causing said capacitor means to charge in a linear fashion.

16. The device of claim 15 wherein said capacitor means is comprised of at least first and second series connected capacitors; second normally cut-off transistor means; and means connecting the common terminal between said first and second capacitors and the base electrode of said second transistor means to drive said second transistor means into conduction when the charge across said capacitors achieves a predetermined level.

17. The device of claim 15 wherein said capacitor means is comprised of at least first and second series connected capacitors; second normally cut-off transistor means; and further means connecting the common terminal between said first and second capacitors and the base electrode of said second transistor means for driving said second transistor means into conduction when the charge across said capacitors achieves a predetermined level; adjustable potentiometer means coupled between the emitter and base elements of said first and second transistor means for adjusting the cut-off level for said second transistor means to control the time interval marked off by said timing means.

18. The device of claim 16 further comprising third transistor means coupled across said first and second capacitors to discharge said capacitors in readiness for marking off a new timing interval.

19. The device of claim 8 wherein said logic circuit means is comprised of a first AND gate and a first OR gate each having first and second inputs for receiving the outputs from said third and fourth means respectively, inverter mean coupled to the output of said first OR gate; a second OR gate having first and second inputs connected to the outputs of said first AND gate and said inverter means respectively, a second AND gate having first, second and third inputs; a second inverter means coupled between the output of said second OR gate and the first input of said second AND gate; the second input of said second AND gate being coupled to the output of said third means; the output of said timing means being coupled to the second AND gate third input; said second AND gate generating a signal at the end of a bit interval during the presence of a valid mark bit only.

20. The device of claim 19 where said logic circuit means is further comprised of a third AND gate having inputs coupled respectively, to the outputs of said timing means and said second OR gate for generating an output when both said first and second means or when neither said first and second means generate outputs.

21. The device of claim 19 where said logic circuit means is further comprised of a third AND gate having inputs coupled respectively, to the outputs of said timing means and said second OR gate for generating an output from both said first and second means or when neither said first and second means generate outputs; difference amplifier means for generating a signal when said first means output voltage exceeds said second means output voltage; a fourth AND gate having inputs coupled to the outputs of said difference amplifier and said third AND gate.

22. The device of claim 19 where said logic circuit means is further comprised of a third AND gate having inputs coupled respectively to the outputs of said timing means and said second OR gate for generating an output when both said first and second means or when neither said first and second means generate outputs; difference amplifier means for generating a signal when said first means output voltage exceeds said second means output voltage; a fourth AND gate having inputs coupled to the outputs of said difference amplifier and said third AND gate; demodulator means for independently determining the state of each received data bit; a fifth AND gate having the inputs coupled to the outputs of said third AND gate and said demodulator means.

23. The device of claim 19 where said logic circuit means is further comprised of a third AND gate having inputs coupled respectively to the outputs of said timing means and said second OR gate for generating an output when both said first and second means or when neither said first and second means generate outputs; difference amplifier means for generating a signal when said first means output voltage exceeds said second means output voltage; a fourth AND gate having inputs coupled to the outputs of said difference amplifier and said third AND gate; demodulator means for independently determining the state of each received data bit; a fifth AND gate having the inputs coupled to the outputs of said third AND gate and said demodulator means; a third OR gate having inputs coupled to the outputs of said second, fourth and fifth AND gates.

24. The device of claim 23 wherein said logic circuit means is further comprised of first and second storage means for temporarily storing the binary level of said third and fourth means outputs during the examination of a data bit; means coupled to said timing means for resetting said first and second storage means at the termination of a bit interval.

25. The device of claim 8 wherein said logic circuit means is comprised of sixth means for generating an output when only one of said third and fourth means generate an output.

26. The device of claim 8 wherein said logic circuit means is comprised of sixth means for generating an output when only one of said third and fourth means generate an output; seventh means for generating an output when neither of said third and fourth means generate an output.

27. The device of claim 8 wherein said logic circuit means is comprised of sixth means for generating an output when only one of said third and fourth means generate an output; seventh means for generating an output when neither of said third and fourth means generate an output; said seventh means further comprising eighth means for generating an output when both of said third and fourth means generates an output.

28. For use in a communications system to establish the ambiguity or clarity of each binary bit received, comprising: first means for receiving incoming information signals; second means for examining the state of each information bit received; said second means being comprised of means for dividing the duration of each information bit into a plurality of intervals; third means for accumulatively storing a signal during each interval representing the amplitude and duration of each information bit portion occurring during an associated interval; fourth means coupled to said third means for generating an output signal when said stored signal reaches a predetermined threshold level and thereby determining the grayness or clarity of each bit; demodulator means connected to said first means for generating a signal representing the binary state of each bit received; said fourth means comprising fifth means for generating a tag signal substantially simultaneously with determination made by said fourth means identifying the ambiguity or clarity of the bit processed by said demodulator means.

References Cited

UNITED STATES PATENTS

| | | | |
|---|---|---|---|
| 2,999,925 | 9/1961 | Thomas | 250—8 |
| 3,166,743 | 1/1965 | Greenwald | 340—347 |
| 3,225,213 | 12/1965 | Hinrichs et al. | 307—88.5 |

MALCOLM A. MORRISON, *Primary Examiner.*

C. E. ATKINSON, *Assistant Examiner.*